United States Patent
Pinel et al.

(10) Patent No.: US 11,600,085 B2
(45) Date of Patent: Mar. 7, 2023

(54) AUTOMATED TRAINING DATA COLLECTION FOR OBJECT DETECTION

(71) Applicant: International Business Machines Corporation, Armonk, NY (US)

(72) Inventors: Florian Pinel, New York, NY (US); Russell Patrick Bobbitt, New York, NY (US); Sharon Laquinta Cham, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 16/939,698

(22) Filed: Jul. 27, 2020

(65) Prior Publication Data
US 2022/0027599 A1 Jan. 27, 2022

(51) Int. Cl.
G06V 20/64 (2022.01)
G06Q 30/06 (2012.01)
G06T 11/20 (2006.01)
G06V 20/00 (2022.01)
G06Q 30/0601 (2023.01)

(52) U.S. Cl.
CPC ......... *G06V 20/64* (2022.01); *G06Q 30/0643* (2013.01); *G06T 11/20* (2013.01); *G06V 20/36* (2022.01); *G06T 2210/12* (2013.01)

(58) Field of Classification Search
CPC ..... B09C 48/914; B29C 48/08; G06T 7/0008; G06K 6/629
See application file for complete search history.

(56) References Cited

U.S. PATENT DOCUMENTS

| | | | | |
|---|---|---|---|---|
| 6,863,517 B2* | 3/2005 | Nissel | ................... | B29C 48/914 425/141 |
| 7,233,241 B2 | 6/2007 | Overhultz et al. | | |
| 7,521,923 B2* | 4/2009 | May | ........................ | G01D 5/14 324/207.16 |
| 7,629,985 B2* | 12/2009 | McArdle | ................. | G06F 30/13 345/619 |

(Continued)

FOREIGN PATENT DOCUMENTS

WO 2018069861 A1 4/2018

OTHER PUBLICATIONS

Harwell et al., "Inside Amazon Go: The camera-filled convenience store that watches you back", The Washington Post, Business, Jan. 22, 2018, 11 pages. https://www.washingtonpost.com/news/business/wp/2018/01/22/inside-amazon-go-the-camera-filled-convenience-store-that-watches-you-back/?noredirect=on&utm_term=.0277e506a689.

(Continued)

*Primary Examiner* — Yosef Kassa
(74) *Attorney, Agent, or Firm* — James L. Olsen

(57) ABSTRACT

A method, system, and computer program product for automated collection of training data and training object detection models is provided. The method generates a set of reference images for a first set of products. Based on the set of reference images, the method identifies a subset of products within an image stream. Based on the subset of products, a second set of products is determined within the image stream. The method identifies a set of product gaps based on the subset of products and the second set of products. The method generates a product detection model based on the set of reference images, the subset of products, the second set of products, and the product gaps.

17 Claims, 7 Drawing Sheets

(56) References Cited

U.S. PATENT DOCUMENTS

| | | | |
|---|---|---|---|
| 7,726,875 B2* | 6/2010 | Yuhas | G01N 29/07 |
| | | | 374/7 |
| 8,063,339 B2* | 11/2011 | Paquette | B23K 9/0673 |
| | | | 219/136 |
| 8,256,953 B2* | 9/2012 | Yuhas | G01K 11/24 |
| | | | 374/30 |
| 8,321,303 B1 | 11/2012 | Krishnamurthy et al. | |
| 8,630,924 B2 | 1/2014 | Groenevelt et al. | |
| 8,833,541 B2* | 9/2014 | Aillon | B65G 47/50 |
| | | | 198/369.1 |
| 9,123,111 B2* | 9/2015 | Fan | G06T 7/74 |
| 9,443,164 B2 | 9/2016 | Sulc et al. | |
| 9,529,614 B2* | 12/2016 | Lin | G06F 21/55 |
| 9,626,849 B2 | 4/2017 | Dixon et al. | |
| 9,710,926 B2* | 7/2017 | Zhang | G06T 7/0008 |
| 9,735,128 B2* | 8/2017 | Karpman | H01L 24/80 |
| 10,242,264 B1 | 3/2019 | Ten et al. | |
| 2012/0091162 A1 | 4/2012 | Overhultz et al. | |
| 2012/0323620 A1 | 12/2012 | Hofman et al. | |
| 2014/0201041 A1 | 7/2014 | Meyer | |
| 2016/0155011 A1 | 6/2016 | Sulc et al. | |
| 2017/0262795 A1 | 9/2017 | Thapa et al. | |
| 2017/0337508 A1 | 11/2017 | Bogolea et al. | |
| 2018/0253597 A1 | 9/2018 | Kozakaya et al. | |
| 2019/0171897 A1 | 6/2019 | Merai et al. | |

OTHER PUBLICATIONS

Shelfie, Stopping Stock-Outs, printed Feb. 21, 2020, Copyright 2017-2020 Shelfie Pty Ltd, 6 pages. https://shelfieretail.com/.

Data-driving intelligence, Simbe, printed Feb. 21, 2020, © 2020 Simbe Robotics, Inc., 9 pages. https://www.simberobotics.com/platform/intelligence/.

Mell et al., "The NIST Definition of Cloud Computing", Recommendations of the National Institute of Standards and Technology, Special Publication 800-145, Sep. 2011, 7 pages.

* cited by examiner

US 11,600,085 B2

AUTOMATED TRAINING DATA COLLECTION FOR OBJECT DETECTION

BACKGROUND

Computer vision processes are used to detect objects within images or image streams. Object detection and object recognition often uses machine learning models trained on known, labeled images. These machine learning models are often trained on specified sets of objects. For example, a machine learning model may be trained on faces to perform detection of faces within image streams.

SUMMARY

According to an embodiment described herein, a computer-implemented method for automated collection of training data and training object detection models is provided. The method generates a set of reference images for a first set of products. Based on the set of reference images, the method identifies a subset of products within an image stream. Based on the subset of products, a second set of products is determined within the image stream. The method identifies a set of product gaps based on the subset of products and the second set of products. The method generates a product detection model based on the set of reference images, the subset of products, the second set of products, and the product gaps.

According to an embodiment described herein, a system for automated collection of training data and training object detection models is provided. The system includes one or more processors and a computer-readable storage medium, coupled to the one or more processors, storing program instructions that, when executed by the one or more processors, cause the one or more processors to perform operations. The operations generate a set of reference images for a first set of products. Based on the set of reference images, the operations identify a subset of products within an image stream. Based on the subset of products, a second set of products is determined within the image stream. The operations identify a set of product gaps based on the subset of products and the second set of products. The operations generate a product detection model based on the set of reference images, the subset of products, the second set of products, and the product gaps.

According to an embodiment described herein a computer program product for automated collection of training data and training object detection models is provided. The computer program product includes a computer readable storage medium having program instructions embodied therewith, the program instructions being executable by one or more processors to cause the one or more processors to generate a set of reference images for a first set of products. Based on the set of reference images, the computer program product identifies a subset of products within an image stream. Based on the subset of products, a second set of products is determined within the image stream. The computer program product identifies a set of product gaps based on the subset of products and the second set of products. The computer program product generates a product detection model based on the set of reference images, the subset of products, the second set of products, and the product gaps.

DETAILED DESCRIPTION

Figure 1:
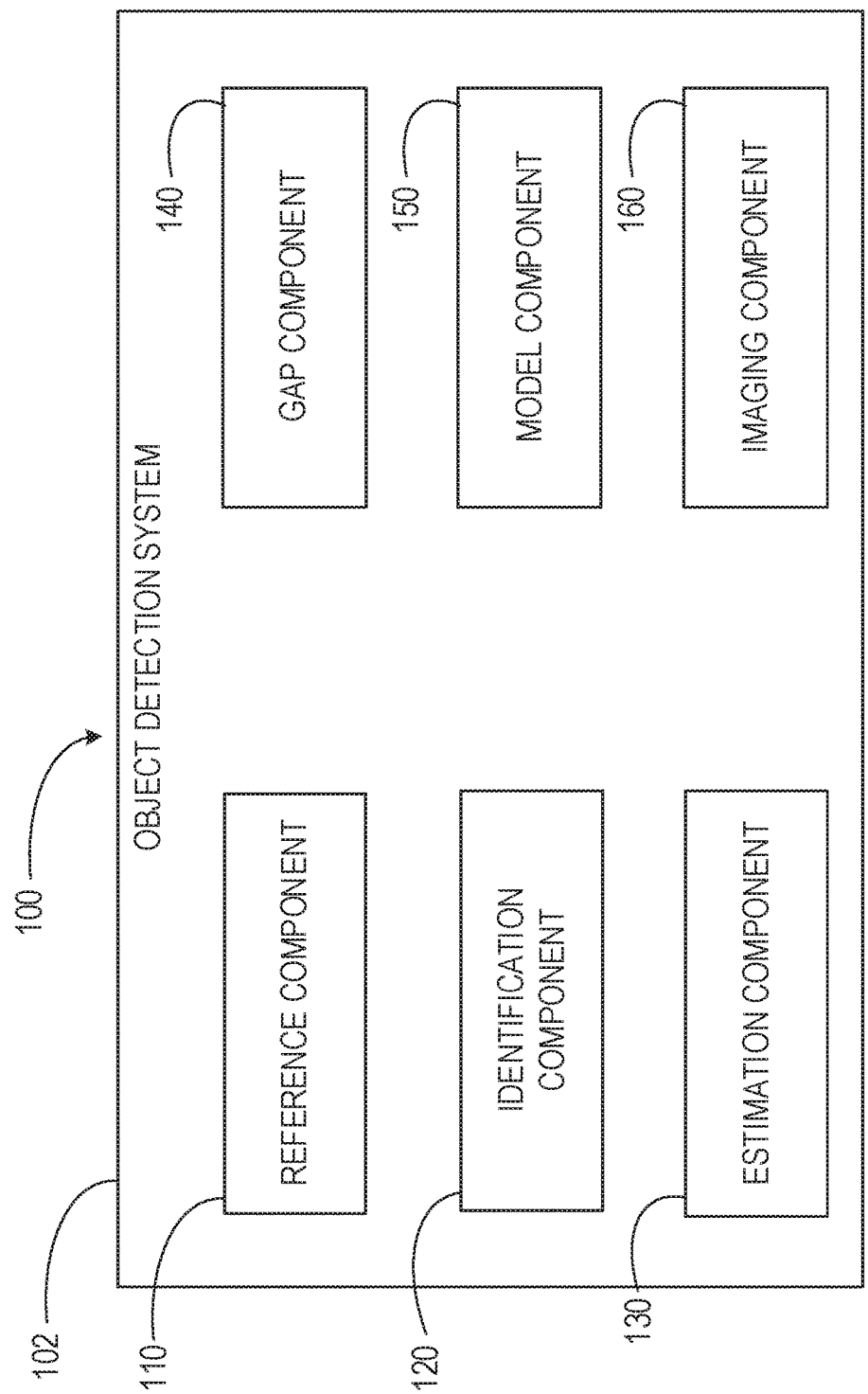
FIG. 1 depicts a block diagram of a computing environment for implementing concepts and computer-based methods, according to at least one embodiment.

The present disclosure relates generally to methods for generation of object detection models. More particularly, but not exclusively, embodiments of the present disclosure relate to a computer-implemented method for automated collection of training data and training location-based object detection models. The present disclosure relates further to a related system for generation of object detection models, and a computer program product for operating such a system.

Computer vision may be used to detect objects within images or image streams. Computer vision technologies are finding use in various industries. In retail stores, computer vision technologies are often used for customer behavior monitoring, checkout-less shopping, and stock monitoring. Current computer vision techniques, software, and devices often fail to adequately meet the needs of such environments as retail stores. In continually changing environments, computer vision technologies may struggle to adequately identify objects of varying types, positions, and placement. For example, retail environments regularly cycle or change products, incorporate new products, change packaging, and change display objects, orientations, and composition. Similarly, current computer vision techniques are often limited in class numbers and types, causing difficulty in identification of a broad range of products with many potential packaging differences. Configuration of shelving units, placement and organization of products, and changes to displays often prevent current computer vision systems and techniques from providing adequate detection and recognition of objects within image streams provided within retail environments. These frequent changes often necessitate updating, retraining, or replacement of computer vision software or devices. In addition to frequent changes of products and presentations within a field of view of a computer vision device, changes in lighting conditions and viewing angles between reference or training images and objects to be detected often cause problems with computer vision techniques, software, and devices.

Systems and methods of the present disclosure provide computer vision, object detection, and object recognition which are robust to movement of objects, changes in shelving and displays, and changes in characteristics or visual depictions of objects or products. In some embodiments, the present disclosure provides for automated acquisition of training images for retraining currently deployed machine learning models for object detection and recognition. The present disclosure provides systems and methods which provide robust object detection and recognition across different lighting conditions, backgrounds, viewing angles without significant loss of accuracy. Some embodiments of the present disclosure enable object detection and recognition for out-of-stock detection and resupply of shelving based on detected product gaps and empty shelf space.

Some embodiments of the concepts described herein may take the form of a system or a computer program product. For example, a computer program product may store program instructions that, when executed by one or more processors of a computing system, cause the computing system to perform operations described above with respect to the computer implemented method. By way of further example, the system may comprise components, such as processors and computer readable storage media. The computer readable storage media may interact with other components of the system to cause the system to execute program instructions comprising operations of the computer implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include an object detection system 102. The object detection system 102 may comprise a reference component 110, an identification component 120, an estimation component 130, a gap component 140, a model component 150, and an imaging component 160. The reference component 110 generates reference images for objects of interest using a combination of captured images and detected identifiers. The identification component 120 identifies objects of interest within a field of view of an image stream. The estimation component 130 determines objects of interest expected to be within the field of view of the image stream containing objects of interest identified by the identification component 120. The gap component 140 identifies and extracts gaps between objects of interest identified within an image stream. The model component 150 generates object detection models based on reference images, objects of interest, expected objects of interest, and gaps. The imaging component 160 captures images of objects of interest within a field of view of an image capture device. Although described with distinct components, it should be understood that, in at least some embodiments, components may be combined or divided, or additional components may be added, without departing from the scope of the present disclosure.

Figure 2:
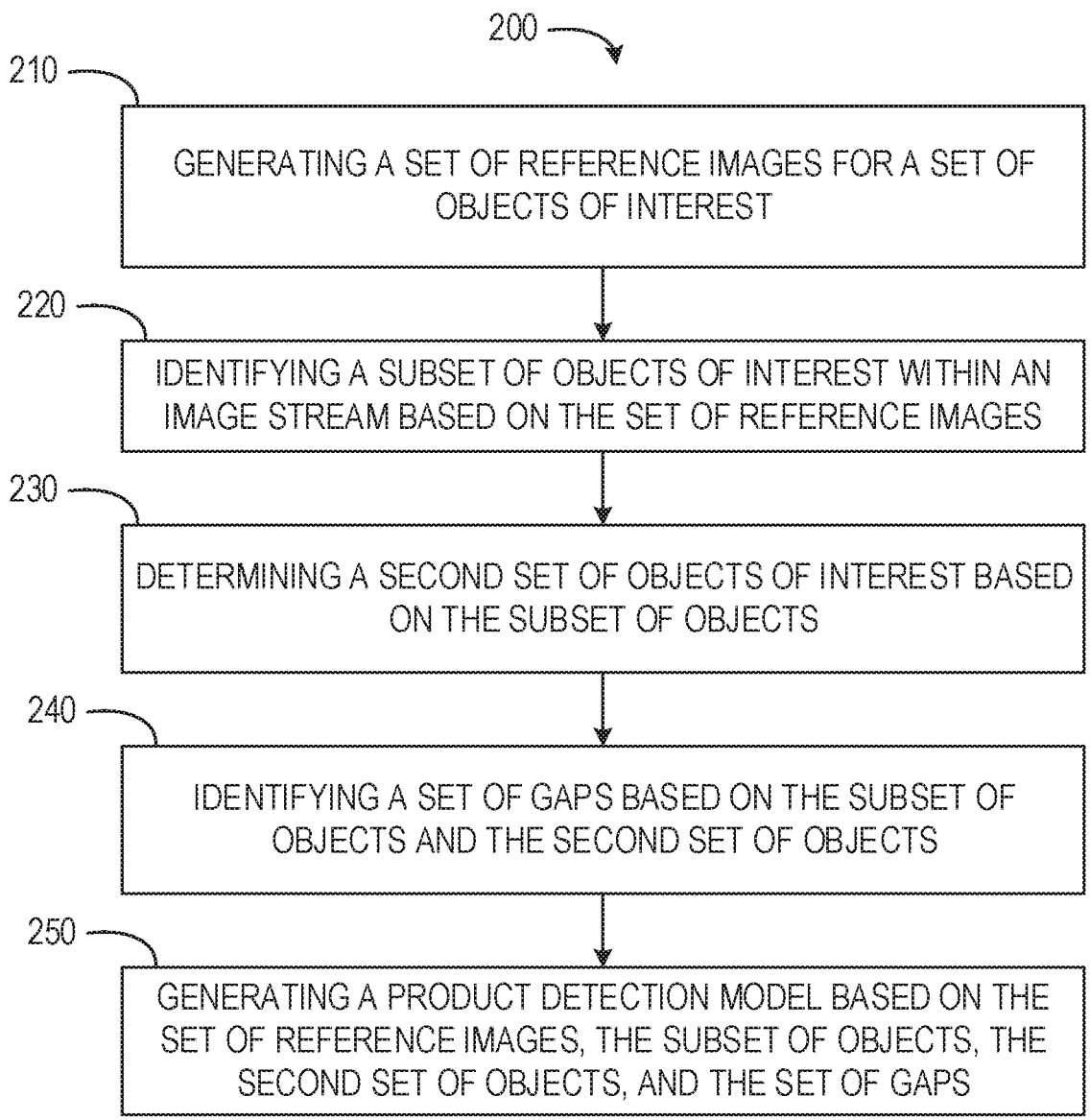
FIG. 2 depicts a flow diagram of a computer-implemented method for automated collection of training data and training object detection models, according to at least one embodiment.

Referring now to FIG. 2, a flow diagram of a computer-implemented method 200 is shown. The computer-implemented method 200 is a method for automated collection of training data and training object detection models. In some embodiments, the computer-implemented method 200 may be performed by one or more components of the computing environment 100, as described in more detail below.

At operation 210, the reference component 110 generates a set of reference images for a set of objects of interest. The set of objects of interest may be a first set of products. The first set of products may be used in reference images to build a product detection model or an object detection model. The reference component 110 may generate the set of reference images using images or portions of images captured by an image capture device. The reference component 110 may generate the set of reference images or annotate the reference images with additional information defining, describing, or associated with the object or product within the field of view of the image capture device.

The images or portions of images may contain at least one product of the first set of products within a field of view of the image or portion of the image. The at least one product, within the field of view, may be oriented in one of a plurality of different orientations. For example, a cereal box may be a product within an image or a portion of an image. The cereal box may be oriented with a flat surface (e.g., a front, a back, a top, a bottom, or a side of the cereal box) facing squarely into the image capture device. The cereal box may also be oriented at an angle to the image capture device, such that one or more corners or one or more vertices are facing into the image capture device.

The additional information may be data or metadata for the object of interest or product to be included in a reference image. The additional information may include labels, identifiers, barcodes, titles, text, radio frequency identification (RFID) information, combinations thereof, or any other suitable information about or associated with the object of interest or product. In some instances, the reference component 110 captures the additional information and the image or portion of an image concurrently. In some instances, capture of one component (e.g., the image or portion of the image and the additional information) of the reference image triggers capture of one or more additional components of the reference image.

In some embodiments, the reference component 110 generates the set of reference images by detecting an identifier for each product of the set of products. For example, an image capture device may be installed or included within a product identification component at a register or point of sale device of a grocery store. The image capture device may be positioned at or near the register in a position suitable to capture a product being scanned at the register within a field of view of the image capture device. The product identification component may also include a scanner to capture information associated with a product being scanned. The scanner may be a barcode scanner, an RFID scanner, an optical scanner, combinations thereof, or any other suitable scanner capable of detecting or registering information related to or presented on a product at the grocery store. In this example, the identifier may be detected as a product is scanned. The identifier may be detected as a barcode or RFID signal containing information about the product being scanned, such as a name, a stock keeping unit (SKU), an inventory number, an inventory amount, a product position within the store, combinations thereof, or any other suitably identifying information. Where a scanner is included at the register, the image capture device may be positioned at, near, or within the scanner, such that the scanner and the image capture device may cooperate to capture information about the product being scanned at the register.

The reference component 110 captures one or more images of each product. The one or more images may be captured based on detecting the identifier. For example, when the scanner within the register of a grocery store scans a barcode for a product, the image capture device associated with or included within the register may capture the one or more images of the object of interest or product. In some embodiments, the image capture device may capture an image stream or set of images while the product is within a field of view of the image capture device. The image stream or set of images may include one or more views, orientations, or positions of the product as the product is being passed over or near the scanner.

The reference component 110 associates each image with the identifier for a product depicted within the image. In some embodiments, the reference component 110 uses an object detector or segmentation component, algorithm, or program to segment a scanned product or object of interest from a captured image stream or set of images. The segmented product or object of interest may be associated with a name or identifier of the product. The reference images may be generated as an annotated image or set of images of the product or object of interest. The annotated image may include one or more visual depictions of the product or object of interest and the metadata for the scanned identifier.

Where reference images are generated for a specified locale the reference images may be shared among additional locales. For example, where a locale of a set of reference images is a first store with a specified address and the first store is part of a set of stores or a chain, the set of reference images may be uploaded to a common network resource or otherwise shared among additional stores of the set of stores. The set of reference images may be shared on the common network resource automatically after being generated. In some instances, the set of reference images may be shared manually. The set of reference images may also be shared by transmitting the set of reference images directly to other stores of the set of stores. In some embodiments, the set of reference images are shared among stores selectively. For example, the set of reference images may be accessible on the network resource or shared with specified stores which stock products associated with the set of reference images. In such instances, where the products are not stocked at a given store, the store may not receive transmission of or have access to the set of reference images.

At operation 220, the identification component 120 identifies a subset of objects of interest or products within an image stream. The subset of products may be identified based on the set of reference images. In some embodiments, the identification component 120 cooperates with or uses a plurality of image capture devices to identify the subset of products. The plurality of image capture devices may be positioned within a physical space or locale to provide image streams with differing fields of view. For example, where the locale is a grocery store, the plurality of image capture devices may be security cameras, product or shelf cameras, mobile cameras (e.g., cameras affixed to a roving drone), combinations thereof, or any other suitable group of image capture devices. Each image capture device of the plurality of image capture devices may have, at least in part, a distinct field of view. In some instances, portions of a field of view of two or more image capture devices may partially overlap.

In some embodiments, the model component 150 trains an initial detection model using the set of reference images from operation 210. The initial detection model may be generated based on all or a portion of reference images of the set of reference images. In some embodiments, the initial detection model is trained on a subset of reference images appearing within a field of view of a specified image capture device. The initial detection model may also be trained on all of the reference images of the set of reference images. In such embodiments, the initial detection model may be used on any image capture device within a locale.

In some embodiments, the identification component 120 identifies the subset of objects of interest within the image stream of an image capture device using the initial detection model. In such instances, the initial detection model is applied to the image stream to identify the subset of objects of interest. For example, the identification component 120 may use the initial detection model with template matching to identify regions within the image stream matching one or more reference images, or portions thereof, from the set of reference images. The matched regions may be determined to include an object of interest of the subset of objects of interest. The subset of objects of interest identified within the image stream may be a portion of the objects of interest or products identified and captured within the set of reference images. For example, an image capture device may be installed in a baking goods aisle of a grocery store, with a field of view including a portion of the baking goods aisle and a group of products displayed on a set of shelves. The identification component 120 may identify a bag of flour from brand A, a bag of sugar from brand B, and a box of gelatin from an undetermined brand within the image stream.

In some embodiments, the identification component 120 identifies the subset of objects of interest within the image stream using object recognition or object detection operations without using the initial detection model. In such instances, the identification component 120 may identify the subset of objects of interest using techniques including edge detection, image segmentation, blob analysis, optical character recognition, feature-based object detection, Viola-Jones, combinations thereof, or any other suitable object detection or object recognition operations.

At operation 230, the estimation component 130 determines a second set of objects of interest or a second set of products within the image stream. The second set of products may be determined based on the subset of products. In some embodiments, the estimation component 130 determines the second set of products based on a product ontology. The product ontology may be a food ontology or other ontological organization of objects or products related to at least one of the subset of products. The estimation component 130 may receive the subset of products identified in operation 220. The estimation component 130 may compare the subset of products with the product ontology for a specified locale. Using the product ontology, the estimation component 130 may identify one or more related, proximate, or alternative products from the product ontology which matches, is similar to, or is positioned proximate to the subset of products within the locale. For example, using the subset of products and the product ontology, the estimation component 130 may determine an aisle designation (e.g., baking aisle) of the field of view. The estimation component 130 may then use the aisle designation to determine the second set of objects of interest or products.

In some embodiments, the estimation component 130 determines the second set of products based on a locale planogram. The locale planogram may be a diagram or model indicating placement of products on shelves within a locale. The locale planogram may be standardized across a set of locales, such as a chain of stores. The locale planogram may also be specific to a given location. In such embodiments, the estimation component 130 may receive the subset of products identified in operation 220. The estimation component 130 may compare the subset of products with products depicted or listed within the planogram. The estimation component 130 may determine or select the second set of products as a group of products, within the planogram, that are proximate to or within a specified vicinity of at least one product of the subset of products.

In some embodiments, the estimation component 130 determines the second set of products by locating the subset of products in the locale planogram which corresponds to a field of view of a specified image capture device (e.g., the image capture device providing the image stream of operation 220). The estimation component 130 may be provided with a locale position for the specified image capture device. The locale position may include the field of view for the specified image capture device. The estimation component 130 may determine a portion of the locale planogram within the field of view. The estimation component 130 may identify the subset of products within the portion of the locale planogram and determine or select the second set of products from the portion of the locale planogram. In some embodiments, the estimation component 130 may identify, using the locale planogram, products outside the field of view of the image capture device, but within a specified vicinity of the subset of products. The estimation component 130 may include one or more of the unseen products in the second set of products.

In some embodiments, the estimation component 130 determines the second set of products using a product catalogue of the locale. The product catalogue may include a list of SKUs for products stocked by the locale. The estimation component 130 may determine the second set of products by identifying, using one or more of the locale planogram and the product catalogue, one or more products which are located proximate to or within a specified vicinity of the subset of products. The estimation component 130 may make a list of SKUs of the one or more proximate products. For example, where the subset of products are determined to be the bag of flour, the bag of sugar, and the box of gelatin, the estimation component 130 may determine that the subset of products are within a baking aisle. From the locale planogram and the product catalogue, the estimation component 130 may determine that cereal and spices are located within the vicinity of the baking aisle. The estimation component 130 may make a list of SKUs from the baking aisle, cereal, and spices categories. These SKUs may be determined as the second set of products.

In some embodiments, the estimation component 130 determines the second set of products by identifying products proximate to the subset of products identified in operation 220. The estimation component 130 may detect the second set of products by applying the initial detection model, object recognition operations, object detection operations, combinations thereof, or any other suitable image recognition processes. In some embodiments, the estimation component 130 applies a machine learning object detection model to the field of view including the subset of products. The machine learning object detection model identifies one or more products within the field of view which are not included in the subset of products. The excluded one or more products may then be determined to be the second set of products.

In some embodiments, the estimation component 130 determines the second set of products by identifying a set of expected products. The set of expected products may be associated with one or more products of the subset of products. The second set of products may be an expected grouping of objects of interest or products expected to be next to, proximate to, or in a vicinity of the subset of products within a given locale. In some embodiments, the estimation component 130 uses information from one or more of the locale planogram, a product catalogue for the locale, the product ontology, the initial detection model (e.g., applying the initial detection model to a field of view of an image capture device), combinations thereof, or any other suitable information source.

The estimation component 130 determines a subset of expected products within the image stream. In some embodiments, the subset of expected products is the second set of products. The subset of expected products may be a list of products extracted from the set of expected products, described above, and which appear within the field of view. The subset of products may be identified by first generating the set of expected products (e.g., identified from the locale planogram or the product catalogue). Reference images of the set of expected products may be compared, such as by template matching, to products identified within the field of view. The portion of products of the set of expected products which are matched in the field of view may be determined to be the subset of expected products.

In some embodiments, the identification component 120 generates a set of bounding boxes for the subset of products. The set of bounding boxes may be proportioned to include the subset of products, such that the set of bounding boxes contain little or no area of the field of view unrelated to the subset of products. In some embodiments, the identification component 120 performs one or more image segmentation operations to generate the set of bounding boxes. Once the set of bounding boxes are generated, the identification component 120 identifies one or more regions outside of the set of bounding boxes. The regions may be divided into product regions and non-product regions. The product regions may contain products or objects of interest. The non-product regions may be devoid of products. For example, non-product regions may include areas of the field of view depicting a floor, a ceiling, or other areas where products are not located according to the locale planogram. The identification component 120 generates an area of interest within a field of view of the stream of images. The area of interest includes the set of bounding boxes and excludes at least a portion of the one or more regions. In some embodiments, the area of interest excludes the non-product regions within the field of view. In such instances, the area of interest includes areas, within the field of view, containing products or objects of interest. The area of interest may also include product regions which do not currently contain products, such as regions containing signs or empty shelves.

At operation 240, the gap component 140 identifies a set of gaps. The set of gaps may be a set of product gaps between two or more products or two or more sets of products. The set of product gaps may be identified based on the subset of products and the second set of products. In some embodiments, the set of product gaps are identified within the area of interest identified in operation 230. In such embodiments, the gap component 140 identifies, within product regions, portions of a shelf devoid of products. The gaps may be a hole, a sign, an unrecognized product, combinations thereof, or any other space between identified objects of interest or products. The gaps may be extracted from the image stream for processing. In some embodiments, each gap of the set of gaps are extracted and processed or analyzed separately.

In some embodiments, the gap component 140 determines the set of product gaps by generating a set of bounding boxes. The set of bounding boxes may be generated around the subset of products and the second set of products. The set of bounding boxes may be generated in a manner similar to or the same as described above with respect to operation 230. The bounding boxes may encompass all of the portions of the area of interest within the field of view of the image stream. In such instances, the set of bounding boxes include all areas with identified products or objects of interest and exclude non-product regions such as floors and ceilings.

The gap component 140 detects one or more unbounded areas within a field of view of the image stream. The gap component 140 extracts a set of candidate gaps from the one or more unbounded areas. The candidate gaps may represent one or more of spaces between products, signage, spaces between shelves, solid portions of shelves, unrecognized products, combinations thereof, or any other spaces or objects previously unrecognized within the field of view.

The gap component 140 excludes a subset of candidate gaps. The candidate gaps may be extracted individually for analysis and processing. The candidate gaps may also be extracted as sets or subsets of candidate gaps. The extracted candidate gaps may be processed or analyzed by one or more components of the object detection system 102. The object detection system 102 may perform one or more object detection or object recognition operations on the extracted set of candidates. In some embodiments, the object detection system 102 performs optical character recognition, edge detection, template matching, combinations thereof, or any other suitable and relevant image detection or image recognition operation. The object detection system 102 may determine a first portion of the candidate gaps which contain signs, shelving ends, or other objects not including one or more products. The object detection system 102 may also determine a second portion of the candidate gaps. The second portion of candidate gaps may define portions of the field of view which lack products, but where products are expected to be, have been, or will be. The gap component 140 may exclude the first portion of the candidate gaps as the subset of candidate gaps.

In some embodiments, the candidate gaps are detected between bounding boxes of detected products within the field of view of the image stream. Gaps are extracted and analyzed as gap candidate images after extraction. Outlier detection algorithms may be used on gap candidates to exclude candidate gaps that are signs or unrecognized products. Candidate gaps that remain may be placed on hold for a period of time. The candidate gaps may be compared against products purchased at a register of a store. The remaining gap candidates, after removing gap candidates associated with a purchase, may be added to training data for gap detection.

At operation 250, the model component 150 generates a product detection model. In some embodiments, the product detection model is generated based on the set of reference images, the subset of products, the second set of products, and the product gaps. The product detection model may be generated for a locale. In some embodiments, the product detection model is generated for a specified image capture device within a locale. For example, the product detection model may be generated for an image capture device mounted in or proximate to a baking aisle of a store.

The model component 150 may generate the product detection model as a machine learning or deep learning model. The model component 150 may use the set of reference images, the subset of products, the second set of products, and the product gaps as training input for the product detection model. In some embodiments, the product detection model is generated iteratively. For example, a product type (e.g., spices) may be initially included in the expected products presented within the second set of products. Where image streams for a number of days lack the product type (e.g., spices) from the second set of products, the product detection model may remove the product type from training data for subsequent training of the product detection model. In such embodiments, unseen products or product categories may be iteratively excluded from the product detection model. Similarly, the product detection model may be validated with each new version of training data. In some embodiments, the model component 150 generates a gap detection model. The gap detection model may be a machine learning model, a neural network, a convolutional neural network, or any other suitable and relevant model. The gap detection model may be configured to detect an absence of products. The absence of products may indicate or represent a gap between products within shelf space housing or displaying a set of products.

Figure 3:
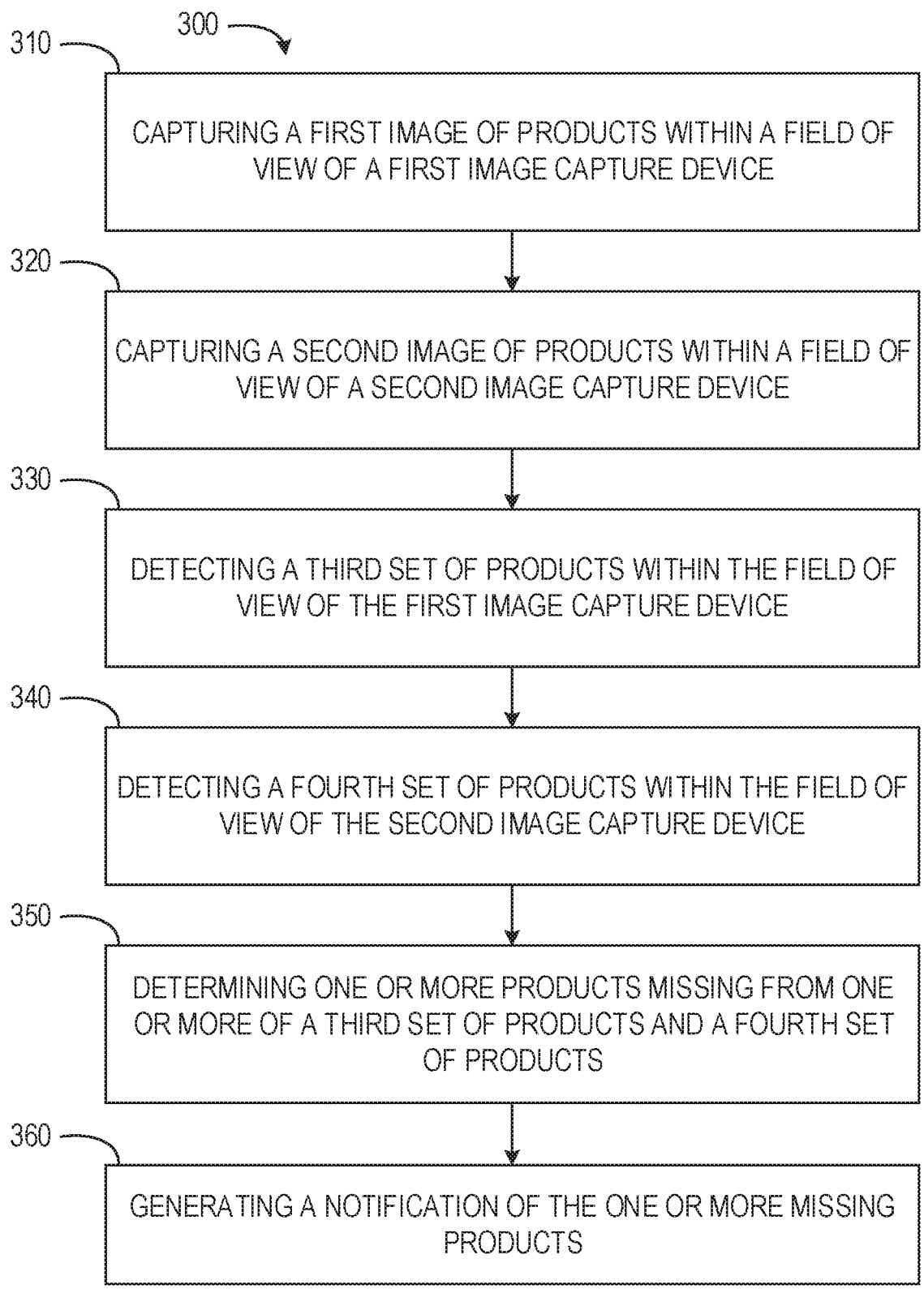
FIG. 3 depicts a flow diagram of a computer-implemented method for automated collection of training data and training location-specific object detection models, according to at least one embodiment.

FIG. 3 shows a flow diagram of an embodiment of a computer-implemented method 300 for automated collection of training data and training location-specific object detection models. The method 300 may be performed by or within the computing environment 100. In some embodiments, the method 300 comprises or incorporates one or more operations of the method 200. In some instances, operations of the method 300 may be incorporated as part of or sub-operations of the method 200.

In some embodiments, a plurality of product detection models may be generated. Product detection models may be generated for specified image capture devices. For example, a location may contain a first image capture device and a second image capture device. A first product detection model and a second product detection model may be generated for the first image capture device and the second image capture device, respectively.

In operation 310, the imaging component 160 captures a first image of products within a field of view of a first image capture device. The first image may be captured by the first image capture device as part of a first image stream. In some instances, the first image is captured by the first image capture device as a single image.

In operation 320, the imaging component 160 captures a second image of products within a field of view of a second image capture device. The second image may be captured by the second image capture device as part of a second image stream. In some instances, the second image is captured by the second image capture device as a single image.

The first image capture device and the second image capture device may be located in differing zones or areas of a given locale. In some embodiments, the first image stream and the second image stream are distinct from one another.

In operation 330, the identification component 120 detects a set of products within the field of view of the first image capture device. In some embodiments where first and second sets of products were used to generate a product detection model, the set of products detected within the field of view of the first image capture device may be a third set of products. The third set of products may be detected in a manner similar to or the same as described above with respect to operations 220 or 230.

In operation 340, the identification component 120 detects a set of products within the field of view of the second image capture device. In some embodiments where first and second sets of products were used to generate the product detection model, the set of products detected within the field of view of the second image capture device may be a fourth set of products. The fourth set of products may be detected in a manner similar to or the same as described above with respect to operations 220 or 230.

In operation 350, the identification component 120 determines one or more products missing from one or more of the third set of products and the fourth set of products. The identification component 120 may determine the one or more missing products based on one or more gaps in regions between at least a portion of the third set of products, at least a portion of the fourth set of products, combinations thereof, or within the third set of products or the fourth set of products. In some embodiments, the identification component 120 determines the one or more missing products based at least in part on the first set of products. In such embodiments, the identification component may compare the first set of products and the locale planogram with gaps occurring with or proximate to one or more of the third set of products and the fourth set of products. The identification component 120 may determine the one or more missing products as one or more products occurring within one or more of the first set of products and the locale planogram, but which are missing from one or more of the third set of products and the fourth set of products.

In operation 360, the identification component 120 generates a notification of the one or more missing products. In some embodiments, the identification component 120 generates the notification as a restocking notice, indicating that the one or more missing products are to be restocked from existing product stock within the locale. In some embodiments, the identification component 120 generates the notification as an order notice, indicating that the one or more missing products are missing from the third set of products, the fourth set of products, and an inventory within the locale, and should be reordered. In some embodiments, the notification is generated within a user interface and presented at one or more computing devices within the locale. The notification may also be automatically transmitted as an order to a supplier of the one or more missing products.

Figure 4:
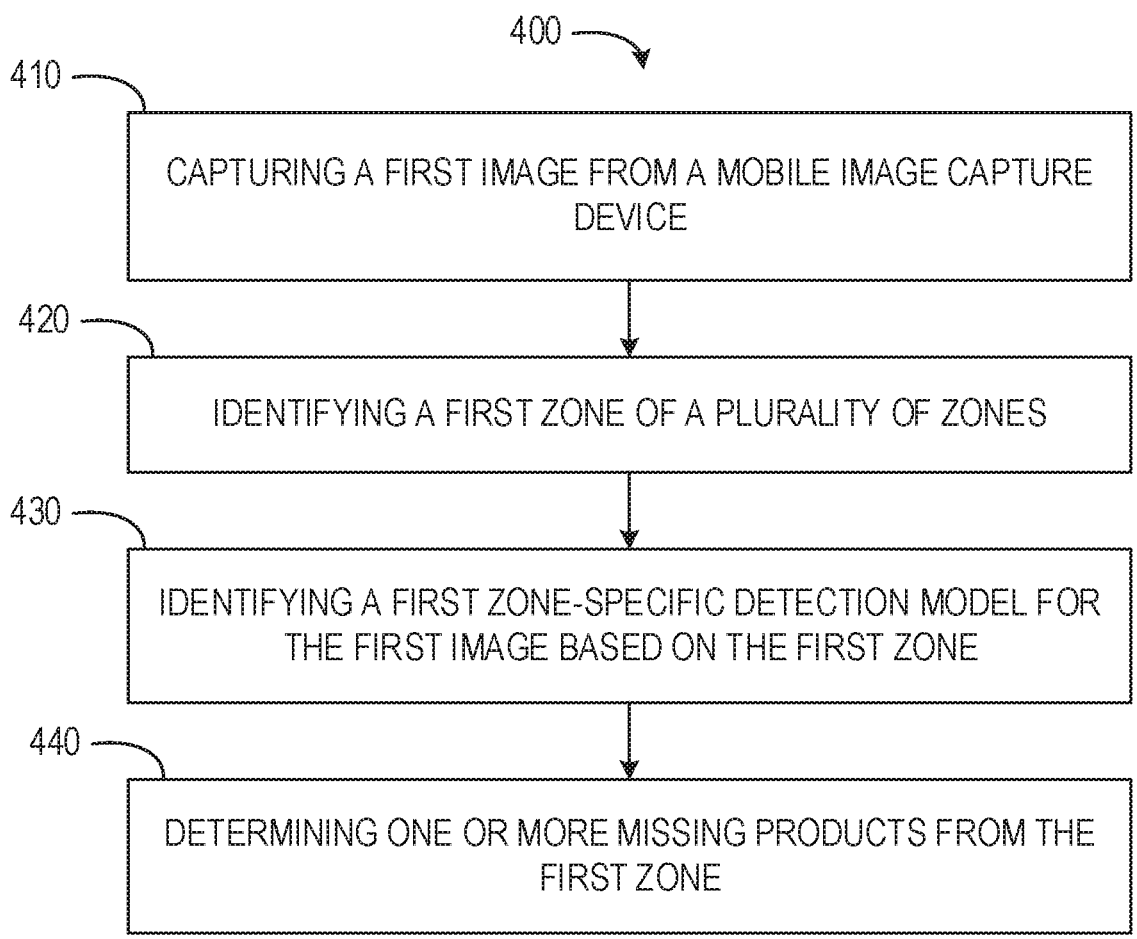
FIG. 4 depicts a flow diagram of a computer-implemented method for automated collection of training data and training object detection models, according to at least one embodiment.

FIG. 4 shows a flow diagram of an embodiment of a computer-implemented method 400 for automated collection of training data and training location-specific object detection models. The method 400 may be performed by or within the computing environment 100. In some embodiments, the method 400 comprises or incorporates one or more operations of the methods 200 or 300. In some instances, operations of the method 400 may be incorporated as part of or sub-operations of the methods 200 or 300.

In operation 410, the imaging component 160 captures a first image from a mobile image capture device. The mobile image capture device may be traversing a plurality of zones. The mobile image capture device may be mounted to a robot, autonomously navigating aisles. The mobile image capture device may also be mounted to a cart or mobility device, navigating aisles under human direction. In some embodiments, a product detection model is generated as a plurality of zone-specific detection models. Each zone-specific detection model is generated for a zone selected from the plurality of zones. The product detection model of each zone may be generated in a manner similar to or the same as described above with respect to operations 210-250.

In operation 420, the identification component 120 identifies a first zone of the plurality of zones. In some embodiments, the mobile image capture device is in the first zone while capturing the first image. The identification component 120 may identify the first zone based on one or more transceivers associated with the mobile image capture device. In such embodiments, the first zone in which the mobile image capture device is located may be identified using WiFi, GPS, radio, or other location signal to triangulate the position of the mobile image capture device within the first zone. The first zone may also be identified based on the locale planogram and objects detected within a video stream of the mobile image capture device, where at least a portion of the objects correspond to objects within the first zone of the locale planogram.

In operation 430, the identification component 120 identifies a first zone-specific detection model for the first image based on the first zone. In some embodiments, each product detection model is generated for a given zone. Upon generation, each product detection model may be associated with an identifier for the zone for which the product detection model was generated. The product detection models, annotated with metadata indicating the zone for that product detection model, may be understood as a zone-specific detection model. To identify the first zone-specific detection model, the identification component 120 may retrieve a first zone identifier for the first zone identified in operation 420. The identification component 120 may query a zone-specific detection model data structure with the first zone identifier. The identification component 120 may then retrieve the first zone-specific detection model based on the query. In some embodiments, the zone-specific detection models may be stored within a memory accessible to or part of the identification component 120. In such embodiments, the identification component 120 may directly retrieve the first zone-specific detection model based upon identifying the first zone.

In operation 440, the identification component 120 determines one or more missing products from the first zone. The one or more missing products may be determined based on the first set of products, the first image, and the first zone-specific detection model. In some embodiments, the identification component 120 determines the one or more missing products by applying the first zone-specific detection model to an image stream from the mobile image capture device. The identification component 120 may match products within the field of view with products for which the first zone-specific detection model is trained to identify. The identification component 120 may compare the matched products with a planogram for the first zone to determine the one or more missing products.

In some embodiments, the identification component 120 identifies gaps within the image stream. The identification component 120 may match the gaps to the planogram for the first zone. Products in the planogram located within the gaps may be determined as the one or more missing products.

Figure 5:
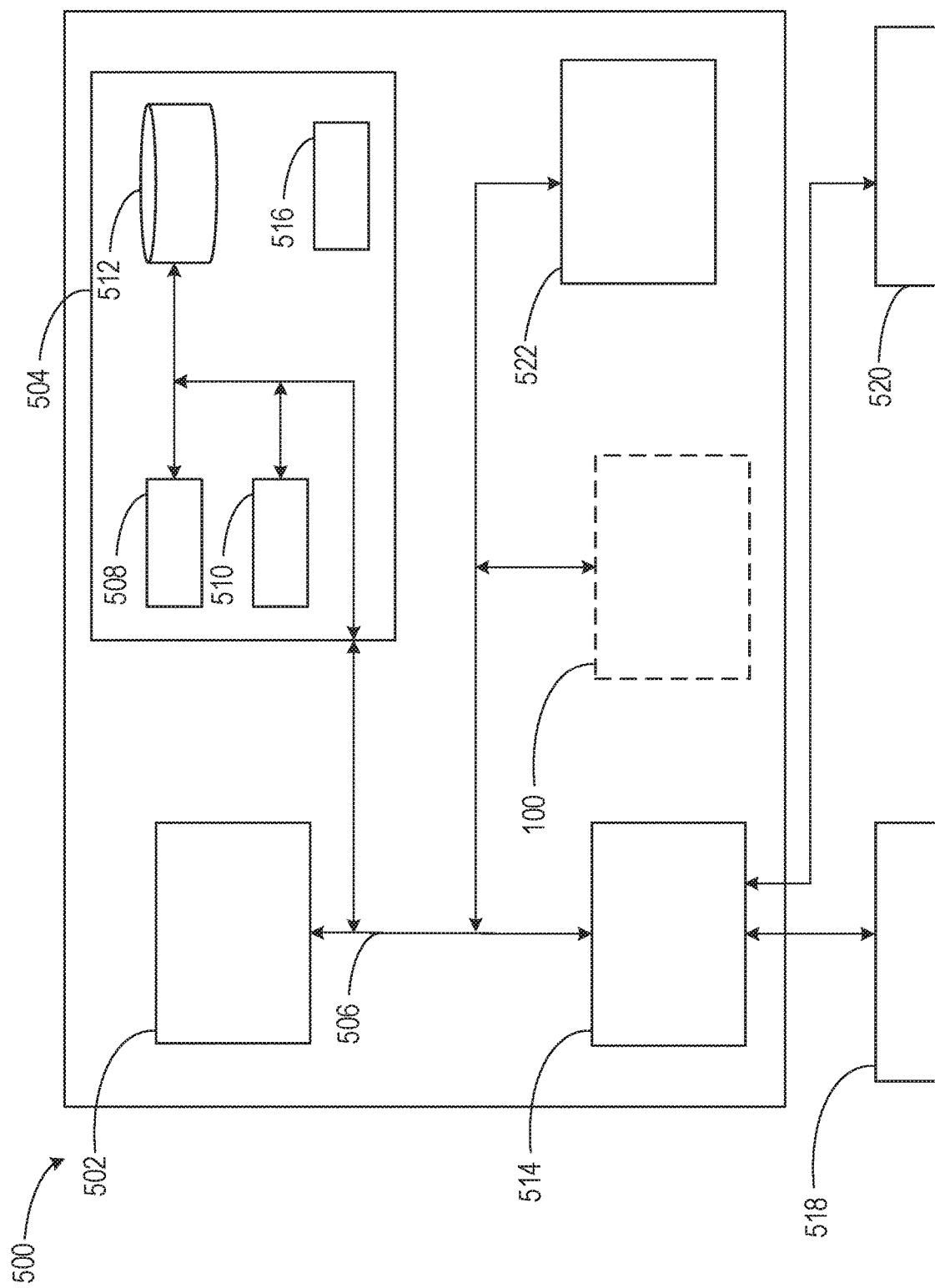
FIG. 5 depicts a block diagram of a computing system for automated collection of training data and training object detection models, according to at least one embodiment.

Embodiments of the present disclosure may be implemented together with virtually any type of computer, regardless of the platform being suitable for storing and/or executing program code. FIG. 5 shows, as an example, a computing system 500 (e.g., cloud computing system) suitable for executing program code related to the methods disclosed herein and for automated collection of training data and training object detection models.

The computing system 500 is only one example of a suitable computer system and is not intended to suggest any limitation as to the scope of use or functionality of embodiments of the present disclosure described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors 502 (e.g., processing units), a system memory 504 (e.g., a computer-readable storage medium coupled to the one or more processors), and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random-access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, the system memory 504 may include at least one program product having a set (e.g., at least one) of program modules that are configured to carry out the functions of embodiments of the present disclosure.

The program/utility, having a set (at least one) of program modules 516, may be stored in the system memory 504 by way of example, and not limiting, as well as an operating system, one or more application programs, other program modules, and program data. Program modules may include one or more of the reference component 110, the identification component 120, the estimation component 130, the gap component 140, the model component 150, and the imaging component 160, which are illustrated in FIG. 1. Each of the operating systems, one or more application programs, other program modules, and program data or some combination thereof, may include an implementation of a networking environment. Program modules 516 generally carry out the functions and/or methodologies of embodiments of the present disclosure, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that, although not shown, other hardware and/or software components could be used in conjunction with computer system/server 500. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 6:
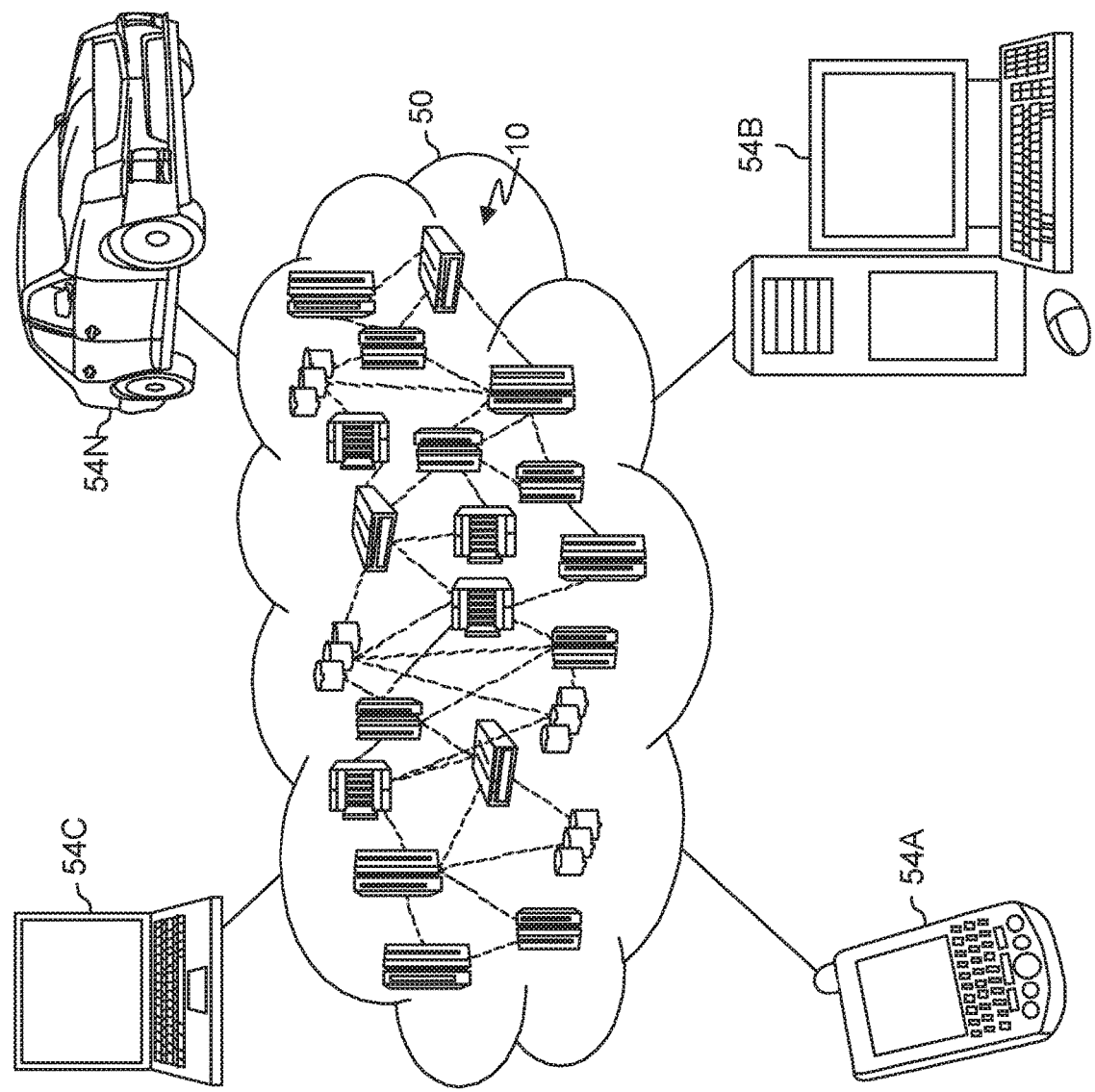
FIG. 6 is a schematic diagram of a cloud computing environment in which concepts of the present disclosure may be implemented, in accordance with an embodiment of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
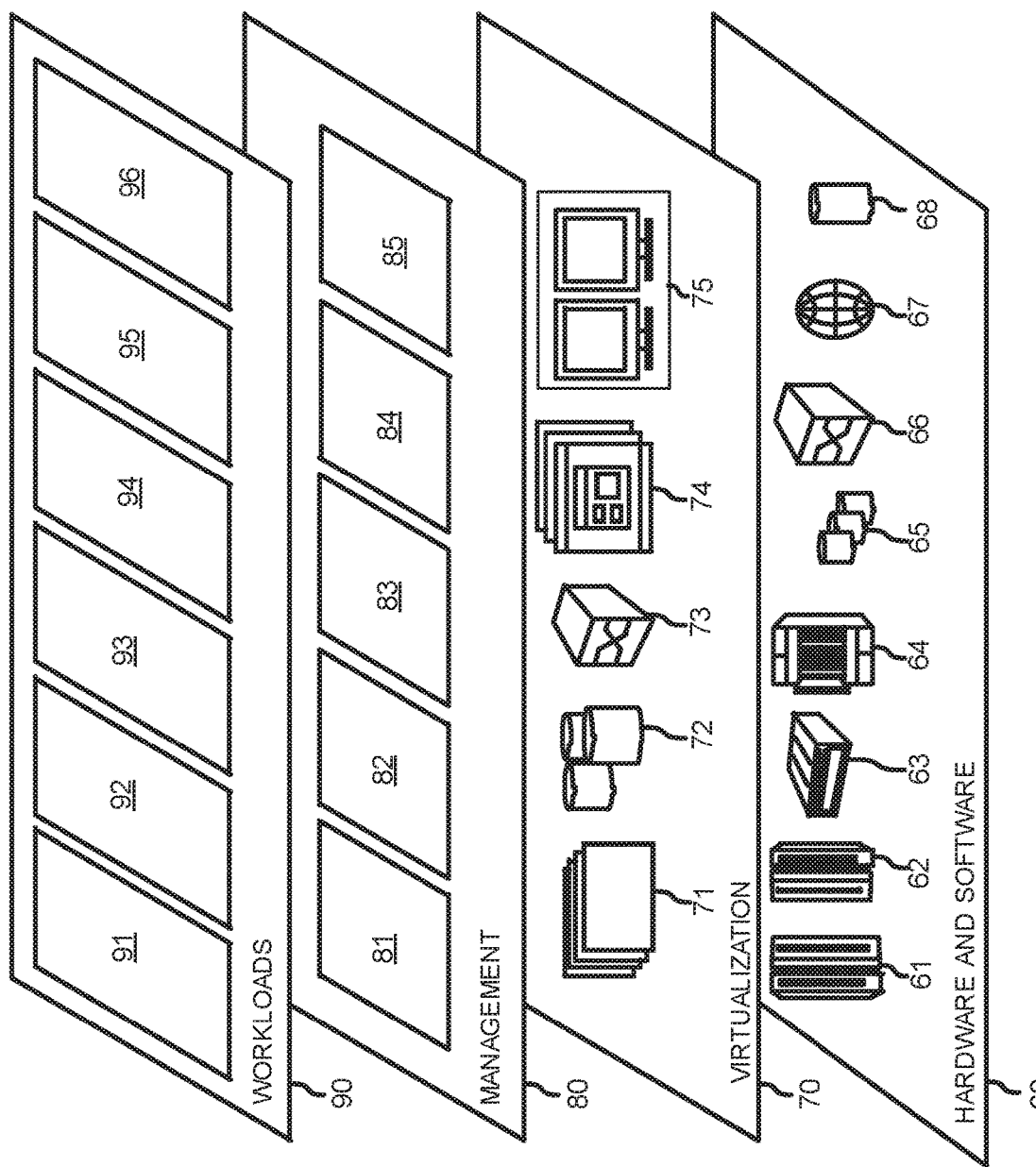
FIG. 7 is a diagram of model layers of a cloud computing environment in which concepts of the present disclosure may be implemented, in accordance with an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and object and gap detection processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   generating a set of reference images for a first set of products;
   based on the set of reference images, identifying a subset of products within an image stream;
   based on the subset of products, determining a second set of products within the image stream;
   based on the subset of products and the second set of products, identifying a set of product gaps, wherein identifying the set of product gaps further comprises:
   generating a set of bounding boxes around the subset of products and the second set of products;
   detecting one or more unbounded areas within a field of view of the image stream;
   extracting a set of candidate gaps from the one or more unbounded areas; and
   excluding a subset of candidate gaps; and
   generating a product detection model based on the set of reference images, the subset of products, the second set of products, and the product gaps.

2. The computer-implemented method of claim 1, wherein generating the set of reference images further comprises:
   detecting an identifier for each product of the first set of products;
   based on detecting the identifier, capturing one or more images of each product; and
   associating each image with the identifier for a product depicted within the image.

3. The computer-implemented method of claim 1, wherein determining the second set of products further comprises:
   identifying a set of expected products associated with one or more products of the subset of products; and
   determining a subset of expected products within the image stream, the subset of expected products being the second set of products.

4. The computer-implemented method of claim 1, further comprising:
   identifying one or more regions outside of the set of bounding boxes; and
   generating an area of interest within a field of view of the image stream including the set of bounding boxes and excluding at least a portion of the one or more regions.

5. The computer-implemented method of claim 1, wherein the product detection model is generated as a first product detection model and a second product detection model, the first product detection model generated for a first image capture device and the second product detection model generated for a second image capture device, and wherein the method further comprises:
   capturing, at the first image capture device, a first image of products within a field of view of the first image capture device;
   capturing, at the second image capture device, a second image of products within a field of view of the second image capture device;
   detecting, using the first product detection model, a third set of products within the field of view of the first image capture device;
   detecting, using the second product detection model, a fourth set of products within the field of view of the second image capture device; and
   determining, based on the first set of products, one or more products missing from one or more of the third set of products and the fourth set of products.

6. The computer-implemented method of claim 1, wherein the product detection model is generated as a plurality of zone-specific detection models with each zone-specific detection model being generated for a zone selected from a plurality of zones, and wherein the method further comprises:
   capturing a first image from a mobile image capture device traversing the plurality of zones;
   identifying a first zone of the plurality of zones, the mobile image capture device being in the first zone while capturing the first image;

identifying a first zone-specific detection model for the first image based on the first zone; and based on the first set of products, the first image, and the first zone-specific detection model, determining one or more missing products for the first zone.

7. A system, comprising:
one or more processors; and
a computer-readable storage medium, coupled to the one or more processors, storing program instructions that, when executed by the one or more processors, cause the one or more processors to perform operations comprising:
  generating a set of reference images for a first set of products;
  based on the set of reference images, identifying a subset of products within an image stream;
  based on the subset of products, determining a second set of products within the image stream;
  based on the subset of products and the second set of products, identifying a set of product gap, wherein identifying the set of product gaps further comprises:
    generating a set of bounding boxes around the subset of products and the second set of products;
    detecting one or more unbounded areas within a field of view of the image stream;
    extracting a set of candidate gaps from the one or more unbounded areas; and
    excluding a subset of candidate gaps; and
  generating a product detection model based on the set of reference images, the subset of products, the second set of products, and the product gaps.

8. The system of claim 7, wherein generating the set of reference images further comprises:
  detecting an identifier for each product of the first set of products;
  based on detecting the identifier, capturing one or more images of each product; and
  associating each image with the identifier for a product depicted within the image.

9. The system of claim 7, wherein determining the second set of products further comprises:
  identifying a set of expected products associated with one or more products of the subset of products; and
  determining a subset of expected products within the image stream, the subset of expected products being the second set of products.

10. The system of claim 7, wherein the operations further comprise:
  identifying one or more regions outside of the set of bounding boxes; and
  generating an area of interest within a field of view of the image stream including the set of bounding boxes and excluding at least a portion of the one or more regions.

11. The system of claim 7, wherein the product detection model is generated as a first product detection model and a second product detection model, the first product detection model generated for a first image capture device and the second product detection model generated for a second image capture device, and wherein the operations further comprise:
  capturing, at the first image capture device, a first image of products within a field of view of the first image capture device;
  capturing, at the second image capture device, a second image of products within a field of view of the second image capture device;
  detecting, using the first product detection model, a third set of products within the field of view of the first image capture device;
  detecting, using the second product detection model, a fourth set of products within the field of view of the second image capture device; and
  determining, based on the first set of products, one or more products missing from one or more of the third set of products and the fourth set of products.

12. The system of claim 7, wherein the product detection model is generated as a plurality of zone-specific detection models with each zone-specific detection model being generated for a zone selected from a plurality of zones, and wherein the operations further comprise:
  capturing a first image from a mobile image capture device traversing the plurality of zones;
  identifying a first zone of the plurality of zones, the mobile image capture device being in the first zone while capturing the first image;
  identifying a first zone-specific detection model for the first image based on the first zone; and
  based on the first set of products, the first image, and the first zone-specific detection model, determining one or more missing products for the first zone.

13. A computer program product comprising a computer readable storage medium having program instructions embodied therewith, the program instructions being executable by one or more processors to cause the one or more processors to perform operations comprising:
  generating a set of reference images for a first set of products;
  based on the set of reference images, identifying a subset of products within an image stream;
  based on the subset of products, determining a second set of products within the image stream;
  based on the subset of products and the second set of products, identifying a set of product gaps, wherein identifying the set of product gaps further comprises:
    generating a set of bounding boxes around the subset of products and the second set of products;
    detecting one or more unbounded areas within a field of view of the image stream;
    extracting a set of candidate gaps from the one or more unbounded areas; and
    excluding a subset of candidate gaps; and
  generating a product detection model based on the set of reference images, the subset of products, the second set of products, and the product gaps.

14. The computer program product of claim 13, wherein generating the set of reference images further comprises:
  detecting an identifier for each product of the first set of products;
  based on detecting the identifier, capturing one or more images of each product; and
  associating each image with the identifier for a product depicted within the image.

15. The computer program product of claim 13, wherein determining the second set of products further comprises:
  identifying a set of expected products associated with one or more products of the subset of products; and
  determining a subset of expected products within the image stream, the subset of expected products being the second set of products.

16. The computer program product of claim 13, wherein the product detection model is generated as a first product detection model and a second product detection model, the first product detection model generated for a first image capture device and the second product detection model generated for a second image capture device, and wherein the operations further comprise:

capturing, at the first image capture device, a first image of products within a field of view of the first image capture device;

capturing, at the second image capture device, a second image of products within a field of view of the second image capture device;

detecting, using the first product detection model, a third set of products within the field of view of the first image capture device;

detecting, using the second product detection model, a fourth set of products within the field of view of the second image capture device; and determining, based on the first set of products, one or more products missing from one or more of the third set of products and the fourth set of products.

17. The computer program product of claim 13, wherein the product detection model is generated as a plurality of zone-specific detection models with each zone-specific detection model being generated for a zone selected from a plurality of zones, and wherein the operations further comprise:

capturing a first image from a mobile image capture device traversing the plurality of zones;

identifying a first zone of the plurality of zones, the mobile image capture device being in the first zone while capturing the first image;

identifying a first zone-specific detection model for the first image based on the first zone; and based on the first set of products, the first image, and the first zone-specific detection model, determining one or more missing products for the first zone.

\* \* \* \* \*